(12) United States Patent
Liu et al.

(10) Patent No.: US 12,557,139 B2
(45) Date of Patent: Feb. 17, 2026

(54) SIDELINK LISTEN-BEFORE-TALK SENSING

(71) Applicant: QUALCOMM Incorporated, San Diego, CA (US)

(72) Inventors: Chih-Hao Liu, San Diego, CA (US); Qing Li, Princeton Junction, NJ (US); Giovanni Chisci, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/490,554

(22) Filed: Oct. 19, 2023

(65) Prior Publication Data

US 2025/0133589 A1  Apr. 24, 2025

(51) Int. Cl.
*H04W 74/0808* (2024.01)

(52) U.S. Cl.
CPC ............... *H04W 74/0808* (2013.01)

(58) Field of Classification Search
CPC .................................................. H04W 74/0808
See application file for complete search history.

(56) References Cited

U.S. PATENT DOCUMENTS

| | | | |
|---|---|---|---|
| 2018/0367282 A1* | 12/2018 | Li | H04W 72/1268 |
| 2022/0346127 A1* | 10/2022 | Shah | H04W 72/1268 |
| 2023/0077269 A1* | 3/2023 | Liu | H04B 17/318 |

\* cited by examiner

*Primary Examiner* — James P Duffy
(74) *Attorney, Agent, or Firm* — Harrity & Harrity, LLP

(57) ABSTRACT

Various aspects of the present disclosure generally relate to wireless communication. Some aspects more specifically relate to consistent listen-before-talk (LBT) failure recovery for sidelink communications. In some aspects, a medium access control (MAC) layer may transmit, and a physical (PHY) layer may receive, an indication to perform LBT sensing for one or more resource block sets associated with a consistent LBT failure. The indication to perform LBT sensing may be an indication to perform LBT sensing for sidelink communications without transmitting data. The PHY layer may transmit, and the MAC layer may receive, a result of the LBT sensing. In some aspects, the indication to perform the LBT sensing may be an indication to perform Type 1 LBT sensing or an indication to perform Type 2 LBT sensing, and/or may indicate a quantity of LBT sensing operations to be performed.

30 Claims, 6 Drawing Sheets

SIDELINK LISTEN-BEFORE-TALK SENSING

FIELD OF THE DISCLOSURE

Aspects of the present disclosure generally relate to wireless communication and specifically relate to techniques, apparatuses, and methods for sidelink listen-before-talk sensing.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

Listen-before-talk (LBT) is a process that can be used for managing and avoiding interference between different devices attempting to transmit data on a shared communication channel. For example, a user equipment (UE) may perform LBT on a wireless communication channel to avoid interfering with a transmission by another UE that is using the same channel. To perform the LBT, the UE may monitor the communication channel to identify whether the channel is being used by one or more other devices. In some examples, the UE may measure an energy level of the channel to identify whether the channel is currently in use. For example, the UE may compare the energy level to an energy level threshold, where an energy level that satisfies the energy level threshold indicates that the channel is being used by another device, and an energy level that does not satisfy the energy level threshold indicates that the channel is not being used by another device. If the UE identifies that the channel is being used by another device, the UE may defer a transmission on the channel until the channel becomes available (for example, until the channel is no longer being used by the other device). In some examples, to avoid multiple devices attempting to transmit simultaneously after the channel becomes clear, a random backoff may be defined to minimize collisions on the communication channel. After a duration of the listening phase and, in some examples, the random backoff period, the UE may transmit data on the channel in accordance with the channel being clear.

SUMMARY

In some aspects, a method for wireless communication performed at a user equipment (UE) includes transmitting, by a medium access control layer to a physical layer, an indication to perform listen-before-talk (LBT) sensing for one or more resource block sets associated with a consistent LBT failure, wherein the indication to perform LBT sensing indicates to perform LBT sensing for a sidelink communication without transmitting data; and receiving, by the medium access control layer from the physical layer, a result of the LBT sensing.

In some aspects, an apparatus for wireless communication at a UE includes one or more memories storing processor-executable code; and one or more processors coupled with the one or more memories, at least one processor of the one or more processors configured to cause the UE to: transmit an indication to perform LBT sensing for one or more resource block sets associated with a consistent LBT failure, wherein the indication to perform LBT sensing indicates to perform LBT sensing for a sidelink communication without transmitting data; and receive a result of the LBT sensing.

In some aspects, a non-transitory computer-readable medium storing a set of instructions for wireless communication includes one or more instructions that, when executed by one or more processors of a UE, cause the UE to: transmit an indication to perform LBT sensing for one or more resource block sets associated with a consistent LBT failure, wherein the indication to perform LBT sensing indicates to perform LBT sensing for a sidelink communication without transmitting data; and receive a result of the LBT sensing.

In some aspects, an apparatus for wireless communication includes means for transmitting an indication to perform LBT sensing for one or more resource block sets associated with a consistent LBT failure, wherein the indication to perform LBT sensing indicates to perform LBT sensing for a sidelink communication without transmitting data; and means for receiving a result of the LBT sensing.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
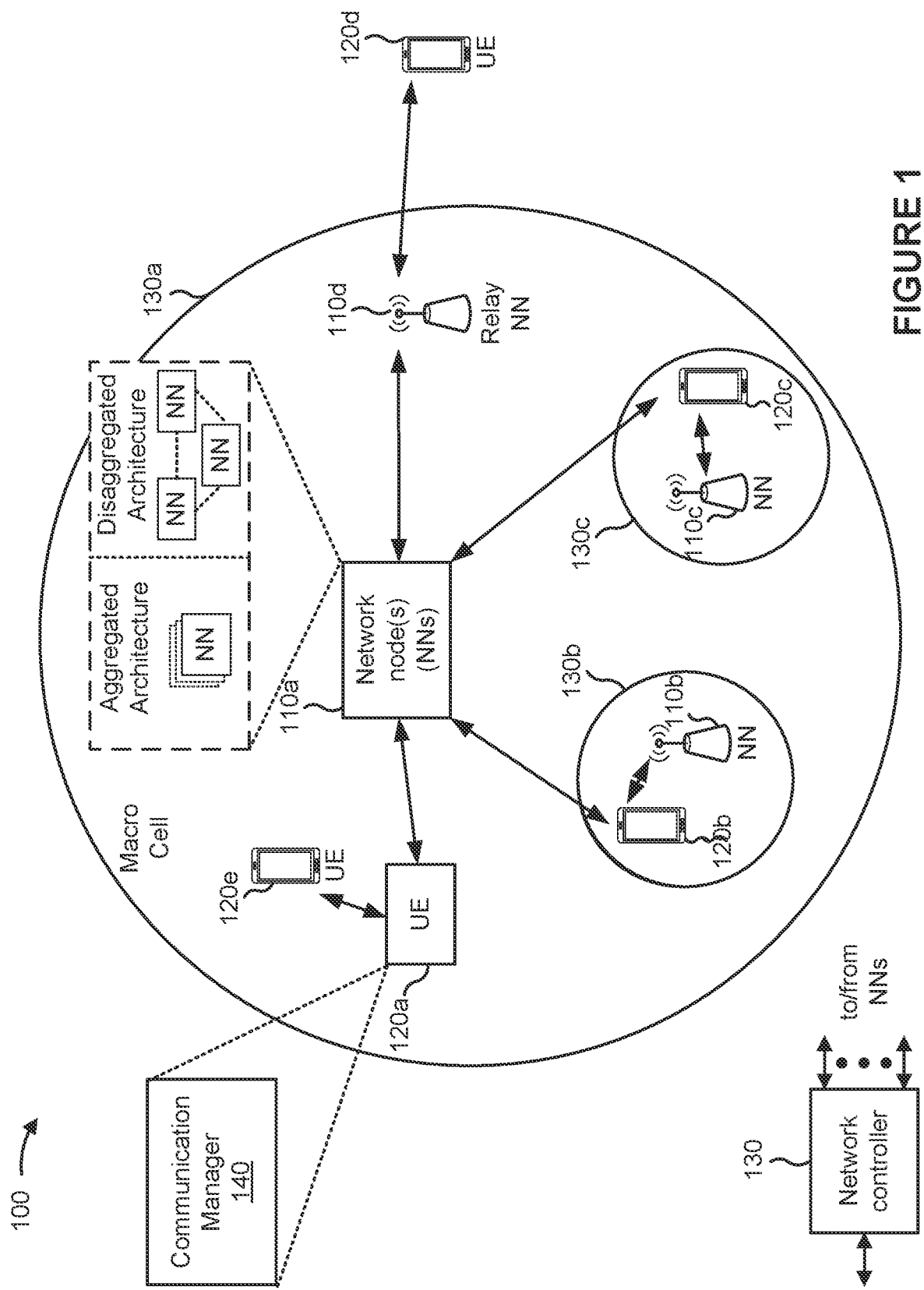
FIG. 1 is a diagram illustrating an example of a wireless network.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Listen-before-talk (LBT) is a process that can be used for managing and avoiding interference between different devices attempting to transmit data on a shared communication channel. For example, a user equipment (UE) may perform LBT on a wireless communication channel to avoid interfering with a transmission by another UE that is using the same channel. To perform the LBT, the UE may monitor the communication channel to identify whether the channel is being used by one or more other devices. For example, the UE may perform a clear channel assessment (CCA) process to identify a presence of signals on the channel. In some examples, the UE may measure an energy level of the channel to identify whether the channel is currently in use. For example, the UE may compare the energy level to an energy level threshold, where an energy level that satisfies the energy level threshold indicates that the channel is being used by another device, and an energy level that does not satisfy the energy level threshold indicates that the channel is not being used by another device. If the UE identifies that the channel is being used by another device, the UE may defer a transmission on the channel until the channel becomes available (for example, until the channel is no longer being used by the other device). In some examples, to avoid multiple devices attempting to transmit simultaneously after the channel becomes clear, a random backoff may be defined to minimize collisions on the communication channel. After a duration of the listening phase and, in some examples, the random backoff period, the UE may transmit data on the channel in accordance with the channel being clear.

In some examples, the LBT process may be a Type 1 LBT process. In Type 1 LBT, the UE may listen to the channel for a variable time period before identifying whether to transmit on the channel. The duration of the time period may be adaptive and/or may be defined in accordance with traffic conditions. If the channel is busy, the UE may extend the time period to ensure that the UE can accurately detect an end of ongoing transmissions. In an example Type 1 LBT process, the UE may identify an initial counter value that is a randomly selected value between zero and a value associated with a contention window duration, and may perform a transmission in accordance with an expiration of a timer configured with the initial counter value. The initial counter value may be decreased, for example, when the channel is idle for a time period. In some other examples, the LBT process may be a Type 2 LBT process (which may also be referred to as a one-shot LBT process). In Type 2 LBT, the UE may listen to the channel for a fixed time period before identifying whether to transmit on the channel. If the channel is found to be busy during the fixed time period, the UE may defer the transmission until the channel becomes available. The fixed period may be constant across a plurality of devices using the Type 2 LBT process. In some examples, there may be different fixed time periods associated with different Type 2 LBT processes. For example, a Type 2-A LBT process may be associated with a first fixed time period (for example, 25 microseconds (µs)) and Type 2-B LBT process may be associated with a second fixed time period (for example, 16 µs).

In some examples, an LBT process may be associated with a consistent LBT failure. A consistent LBT failure may be defined as a quantity of LBT failures that occur within a time period, such as while a consistent LBT failure timer is running. A UE, such as a UE in a sidelink Mode 2 radio resource control (RRC) idle or RRC inactive state, may exclude one or more resource block sets for which sidelink consistent LBT failure was detected from a candidate resource selection process and a resource pool selection (reselection) process. The UE may perform the resource pool selection process in accordance with a sidelink consistent LBT failure being detected for all resource block sets within a selected resource block pool and/or in accordance with a UE implementation.

In some examples, a medium access control (MAC) layer of the UE may provide, to a physical (PHY) layer, an indication of the one or more resource block sets for which a sidelink consistent LBT failure has occurred, and the physical layer may exclude the one or more resource block sets from a candidate resource selection process. After a time period, such as a time period associated with the resource block sets being available again, the UE may cancel the sidelink consistent LBT failure associated with the resource block sets and may include the resource block sets in a resource reselection process. This may be referred to as sidelink consistent LBT failure recovery. In a first example, the UE may perform the sidelink consistent LBT failure recovery in accordance with a timer. In this example, the UE may cancel the sidelink consistent LBT failure for the resource block sets in accordance with an expiration of the timer. The timer may provide a backoff time before the UE is to re-access the resource block sets associated with the sidelink consistent LBT failure. In a second example, the UE may cancel the sidelink consistent LBT failure for the resource block sets in accordance with one or more channel measurements. In this example, the UE may cancel the sidelink consistent LBT failure occurrence for the resource block sets in accordance with a received signal strength indicator (RSSI) measurement, or may perform LBT without transmitting data, to re-evaluate whether the resource block set is to be made available again. In a third example, the UE may cancel the sidelink consistent LBT failure for the resource block sets in accordance with a recovery action.

Timer-based cancellation (as described in the first example) may not guarantee that a resource block set is available after an expiration of the timer. This may result in the UE performing consistent LBT detection, and re-entering a consistent LBT failure state, in accordance with a selection of a resource block set that is not actually available (even after an expiration of the timer). RSSI-measurement cancellation (as described in the second example) may require significant resources in order to define the measurement window across a plurality of sidelink UEs. Thus, in some examples, the UE may perform sidelink consistent LBT failure recovery in accordance with the second example and without transmitting data. In this example, the MAC layer may instruct the PHY layer to perform LBT sensing, without performing a data transmission, to identify whether the resource block set is available. However, the UE may not be configured with information that enables the UE to identify which type of LBT is to be used for the sidelink consistent LBT failure recovery. Additionally, the UE may not be configured to identify a quantity of LBT sensing operations that are to be performed in order to ensure that the resource block set is available. This may result in the UE selecting a resource block set that is not available, for example, in accordance with the UE performing LBT sensing within a gap of consistent interference.

Various aspect generally relate to wireless communications. Some aspects more specifically relate to consistent LBT failure recovery for sidelink communications. In some aspects, a MAC layer may transmit, and a PHY layer may receive, an indication to perform LBT sensing for one or more resource block sets associated with a consistent LBT failure. The indication to perform LBT sensing may be an indication to perform LBT sensing for sidelink communications without transmitting data. The PHY layer may transmit, and the MAC layer may receive, a result of the LBT sensing.

In some aspects, the indication to perform the LBT sensing may be (or may include) an indication to perform Type 2 LBT sensing. For example, the MAC layer may transmit, and the PHY layer may receive, an indication to perform Type 2 LBT sensing. The indication to perform the Type 2 LBT sensing may include an indication to perform Type 2-A LBT sensing or an indication to perform Type 2-B LBT sensing. In some aspects, the indication to perform the LBT sensing may be (or may include) an indication to perform Type 1 LBT sensing. For example, the MAC layer may transmit, and the PHY layer may receive, an indication to perform Type 1 LBT sensing.

In some aspects, the indication to perform the LBT sensing may be (or may include) an indication of a quantity of LBT operations to be performed. In one example, the indication to perform the LBT sensing may include an indication of a quantity of Type 1 LBT sensing operations to be performed by the PHY layer. In another example, the indication to perform the LBT sensing may include an indication of a quantity of Type 2 sensing operations to be performed by the PHY layer.

Particular aspects of the subject matter described in this disclosure can be implemented to realize one or more of the following potential advantages. In some examples, by transmitting the indication to perform LBT sensing for one or more resource block sets associated with a consistent LBT failure, the described techniques can be used to enable the UE to perform sidelink consistent LBT failure recovery. In some examples, by transmitting the indication to perform LBT sensing for sidelink communications without transmitting data, the described techniques can be used to enable the UE to perform sidelink consistent LBT failure recovery without defining an RSSI measurement window across a plurality of UEs, which may reduce network overhead.

In some examples, by transmitting the indication to perform Type 2 LBT sensing or Type 1 LBT sensing, the described techniques can be used to instruct the UE regarding which type of LBT sensing is to be performed. In some examples, by transmitting the indication to perform Type 2 LBT sensing, the described techniques can be used to enable the UE to perform a one-shot LBT process for consistent LBT failure recovery. In some examples, by transmitting the indication to perform Type 2-A LBT sensing, the described techniques can be used to enable the UE to perform the one-shot LBT process for the consistent LBT failure recovery in accordance with a first time period (for example, a longer time period). In some examples, by transmitting the indication to perform Type 2-B LBT sensing, the described techniques can be used to enable the UE to perform the one-shot LBT process for the consistent LBT failure recovery in accordance with a second time period (for example, a shorter time period). In some examples, by transmitting the indication to perform Type 1 LBT sensing, the described techniques can be used to enable the UE to perform consistent LBT failure recovery using a time period that is defined in accordance with one or more conditions, such as one or more channel conditions.

In some examples, by transmitting the indication of the quantity of LBT operations to be performed, the described techniques can be used to enable the UE to perform a quantity of LBT operations (for example, to improve a likelihood that the resource block set is available). In some examples, by transmitting the of the quantity of Type 2 LBT operations to be performed, the described techniques can be used to enable the UE to perform a quantity of Type 2 LBT operations (for example, to improve a likelihood that the fixed time period has a sufficient duration for the resource blocks to become available). In some examples, by transmitting the of the quantity of Type 1 LBT operations to be performed, the described techniques can be used to enable the UE to perform a quantity of Type 1 LBT operations (for example, to improve a likelihood that the variable time period has a sufficient duration for the resource blocks to become available).

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless network. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

In some aspects, the terms "base station" or "network node" may refer to an aggregated base station, a disaggregated base station, an integrated access and backhaul (IAB)

node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses (for example, an augmented reality (AR), virtual reality (VR), mixed reality, or extended reality (XR) headset), a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium. Some UEs 120 (for example, UEs 102a and 120e) may communicate directly using one or more sidelink channels (for example, without a network node as an intermediary to communicate with one another).

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol using for example a PC5 interface for direct communication, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110. In other examples, the two or more UEs 120 may communicate through a vehicle-to-network-vehicle (V2N2V) protocol for example by communicating through a Uu interface using the LTE and/or NR uplink and downlink.

In some aspects, the UE 120 may include a communication manager 140. As described in more detail elsewhere herein, the communication manager 140 may transmit an indication to perform LBT sensing for one or more resource block sets associated with a consistent LBT failure, wherein the indication to perform LBT sensing indicates to perform LBT sensing for a sidelink communication without transmitting data; and receive a result of the LBT sensing. Additionally or alternatively, the communication manager 140 may perform one or more other operations described herein.

Figure 2:
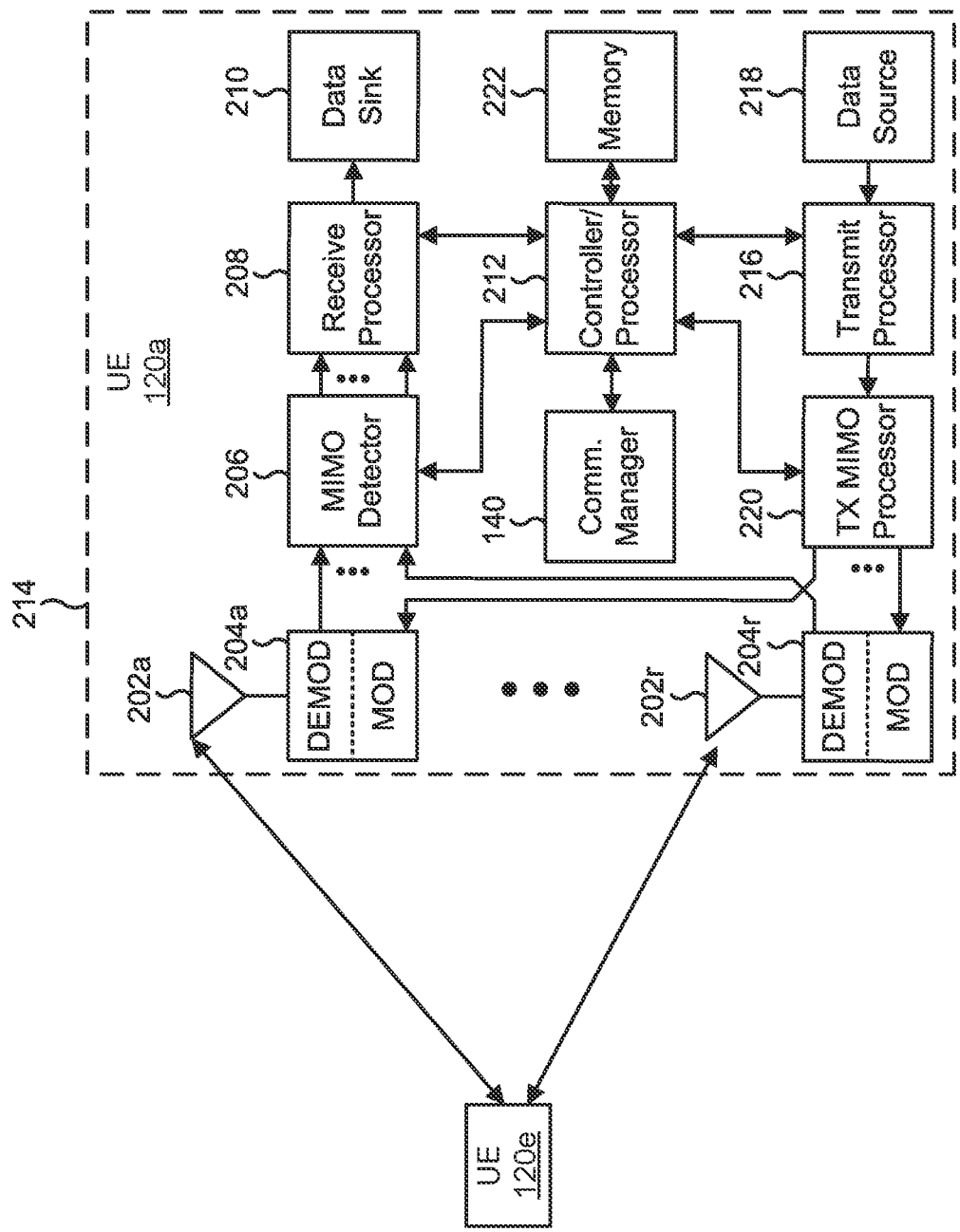
FIG. 2 is a diagram illustrating an example user equipment (UE) in a wireless network.

FIG. 2 is a diagram illustrating an example UE 120a in communication with a UE 120e in a wireless network. The UE 120a and/or the UE 120e may correspond to the UE 120 of FIG. 1. The UE 120a may be equipped with a set of antennas 202 (shown as antennas 202a through 202r), such as R antennas (R≥1). The set of antennas 202 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

At the UE 120a, the set of antennas 202 may receive sidelink signals from the UE 120e and/or other UEs 120 and may provide a set of received signals (for example, R received signals) to a set of modems 204 (for example, R modems), shown as modems 204a through 204r. For example, each received signal may be provided to a demodulator component (shown as DEMOD) of a modem 204. Each modem 204 may use a respective demodulator component to condition (for example, filter, amplify, down-convert, or digitize) a received signal to obtain input samples. Each modem 204 may use a demodulator component to further process the input samples (for example, for OFDM) to obtain received symbols. A MIMO detector 206 may obtain received symbols from the modems 204, may perform MIMO detection on the received symbols if applicable, and may provide detected symbols. A receive processor 208 may process (for example, demodulate and decode) the detected symbols, may provide decoded data for the UE 120a to a data sink 210, and may provide decoded control information and system information to a controller/processor 212. The term "controller/processor" may refer to one or more controllers and/or one or more processors. A channel processor may determine a reference signal received power (RSRP) parameter, an RSSI parameter, a reference signal received quality (RSRQ) parameter, or a channel quality information (CQI) parameter, among other examples. In some examples, one or more components of the UE 120a may be included in a housing 214.

A transmit processor 216 may receive and process data from a data source 218 and control information (for example, for reports that include RSRP, RSSI, RSRQ, or CQI) from the controller/processor 212. The transmit processor 216 may generate reference symbols for one or more reference signals. The symbols from the transmit processor 216 may be precoded by a transmit (TX) MIMO processor 220 if applicable, further processed by the modems 204 (for example, for DFT-s-OFDM or CP-OFDM), and transmitted to the UE 120e. In some examples, the modem 204 of the UE 120a may include a modulator and a demodulator. In some examples, the UE 120a includes a transceiver. The transceiver may include any combination of the antenna(s) 202, the modem(s) 204, the MIMO detector 206, the receive processor 208, the transmit processor 216, or the TX MIMO processor 220. The transceiver may be used by a processor (for example, the controller/processor 212) and a memory 222 to perform aspects of any of the methods described herein. In some examples, the controller/processor 212 represents one or more processors and the memory 222 represents one or more memories.

The controller/processor 212 of the UE 120a, or any other component(s) of FIG. 2 may perform one or more techniques associated with sidelink LBT sensing, as described in more detail elsewhere herein. For example, the controller/processor 212 of the UE 120a, or any other component(s) of FIG. 2 may perform or direct operations of, for example, process 500 of FIG. 5, or other processes as described herein. The memory 222 may store data and program codes for the UE 120a. In some examples, the memory 222 may include a non-transitory computer-readable medium storing one or more instructions (for example, code or program code) for wireless communication. For example, the one or more instructions, when executed (for example, directly, or after compiling, converting, or interpreting) by one or more processors of the UE 120a, may cause the one or more processors and/or the UE 120a to perform or direct operations of, for example, process 500 of FIG. 5, or other processes as described herein. In some examples, executing instructions may include running the instructions, converting the instructions, compiling the instructions, or interpreting the instructions, among other examples. In some implementations, one or more of the multiple memories may be configured to store processor-executable code that, when executed, may configure the one or more processors to perform various functions described herein (as part of a processing system). In some other implementations, the processing system may be pre-configured to perform various functions described herein.

In some aspects, an individual processor may perform all of the functions described as being performed by one or more processors. In some aspects, one or more processors may collectively perform (or be configured or operable to perform) a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

In some aspects, the UE 120 includes means for transmitting, by a medium access control layer to a physical layer, an indication to perform LBT sensing for one or more resource block sets associated with a consistent LBT failure, wherein the indication to perform LBT sensing indicates to perform LBT sensing for a sidelink communication without transmitting data; and/or means for receiving, by the medium access control layer from the physical layer, a result of the LBT sensing.

Figure 3:
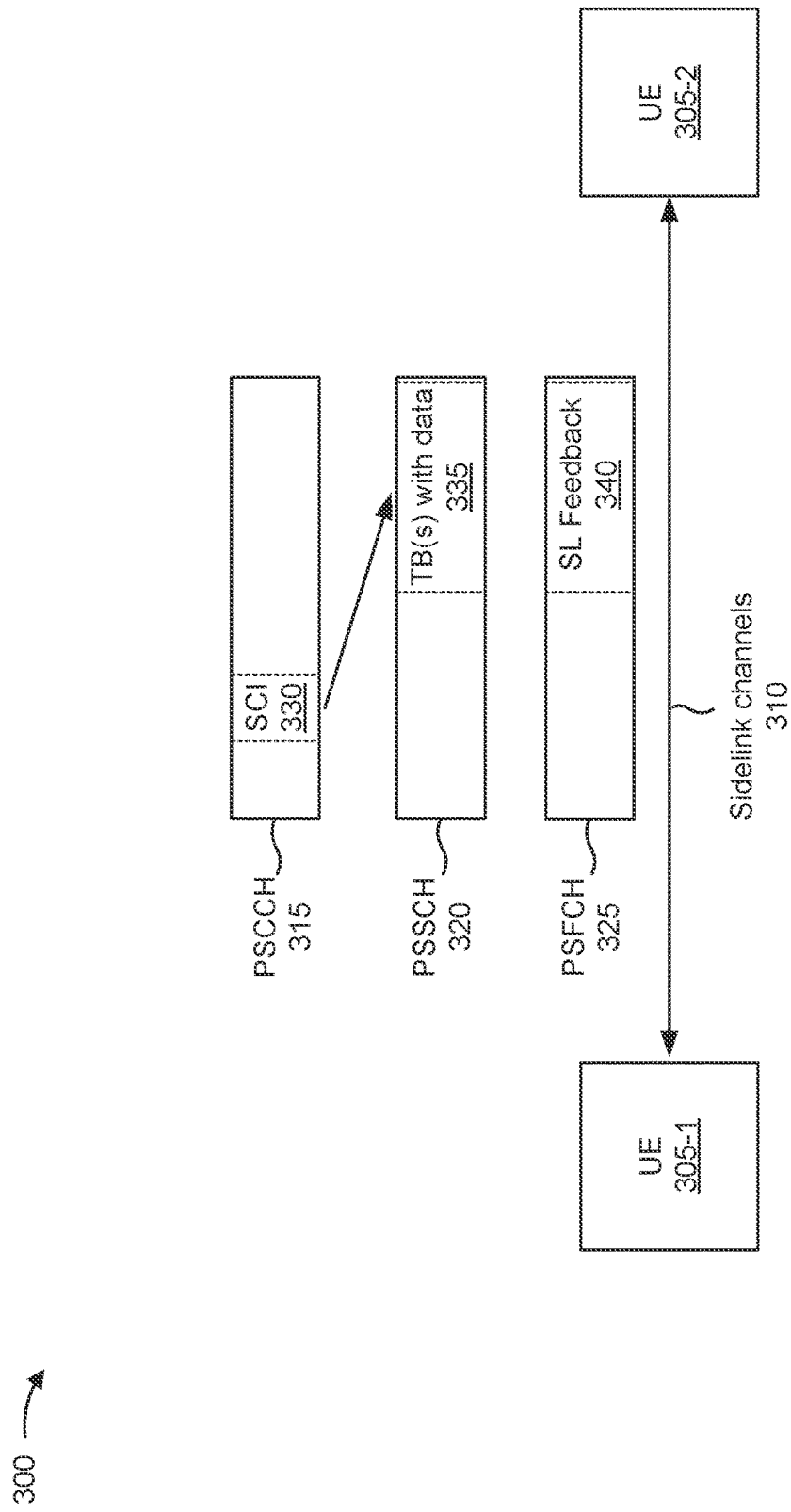
FIG. 3 is a diagram illustrating an example of sidelink communications.

FIG. 3 is a diagram illustrating an example 300 of sidelink communications.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (for example, which may include V2V communications, V2I communications, and/or V2P communications) and/or mesh networking. In some aspects, the UEs 305 (for example, UE 305-1 and/or UE 305-2) may correspond to one or more other UEs described elsewhere herein, such as UE 120. In some aspects, the one or more sidelink channels 310 may use a PC5 interface and/or may operate in a high frequency band (for example, the 5.9 GHz band). Additionally or alternatively, the UEs 305 may synchronize timing of transmission time intervals (TTIs) (for example, frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (for example, time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (for example, acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (for example, time resources, frequency resources, and/or spatial resources) on the PSSCH 320, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (for example, included in SCI 330) may be transmitted in sub-channels using specific resource blocks (RBs) across time. In some aspects, data transmissions (for example, on the PSSCH 320) associated with a scheduling assignment may occupy adjacent RBs in the same subframe as the scheduling assignment (for example, using frequency division multiplexing). In some aspects, a scheduling assignment and associated data transmissions are not transmitted on adjacent RBs.

In some aspects, a UE 305 may operate using a sidelink transmission mode (for example, Mode 1) where resource selection and/or scheduling is performed by a network node 110 (for example, a base station, a CU, or a DU). For example, the UE 305 may receive a grant (for example, in downlink control information (DCI) or in a radio resource control (RRC) message, such as for configured grants) from the network node 110 (for example, directly or via one or more network nodes) for sidelink channel access and/or scheduling. In some aspects, a UE 305 may operate using a transmission mode (for example, Mode 2) where resource selection and/or scheduling is performed by the UE 305 (for example, rather than a network node 110). In some aspects, the UE 305 may perform resource selection and/or scheduling by sensing channel availability for transmissions. For example, the UE 305 may measure an RSSI parameter (for example, a sidelink-RSSI (S-RSSI) parameter) associated with various sidelink channels, may measure a reference signal received power (RSRP) parameter (for example, a PSSCH-RSRP parameter) associated with various sidelink channels, and/or may measure a reference signal received quality (RSRQ) parameter (for example, a PSSCH-RSRQ parameter) associated with various sidelink channels, and may select a channel for transmission of a sidelink communication based at least in part on the measurement(s).

Additionally or alternatively, the UE 305 may perform resource selection and/or scheduling using SCI 330 received in the PSCCH 315, which may indicate occupied resources and/or channel parameters. Additionally or alternatively, the UE 305 may perform resource selection and/or scheduling by determining a channel busy ratio (CBR) associated with various sidelink channels, which may be used for rate control (for example, by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (for example, transmission parameters) to be used for an upcoming sidelink transmission, such as one or more resource blocks to be used for the upcoming sidelink transmission on the PSSCH 320 (for example, for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally or alternatively, the UE 305 may generate a sidelink grant for event-driven scheduling, such as for an on-demand sidelink message.

Figure 4:
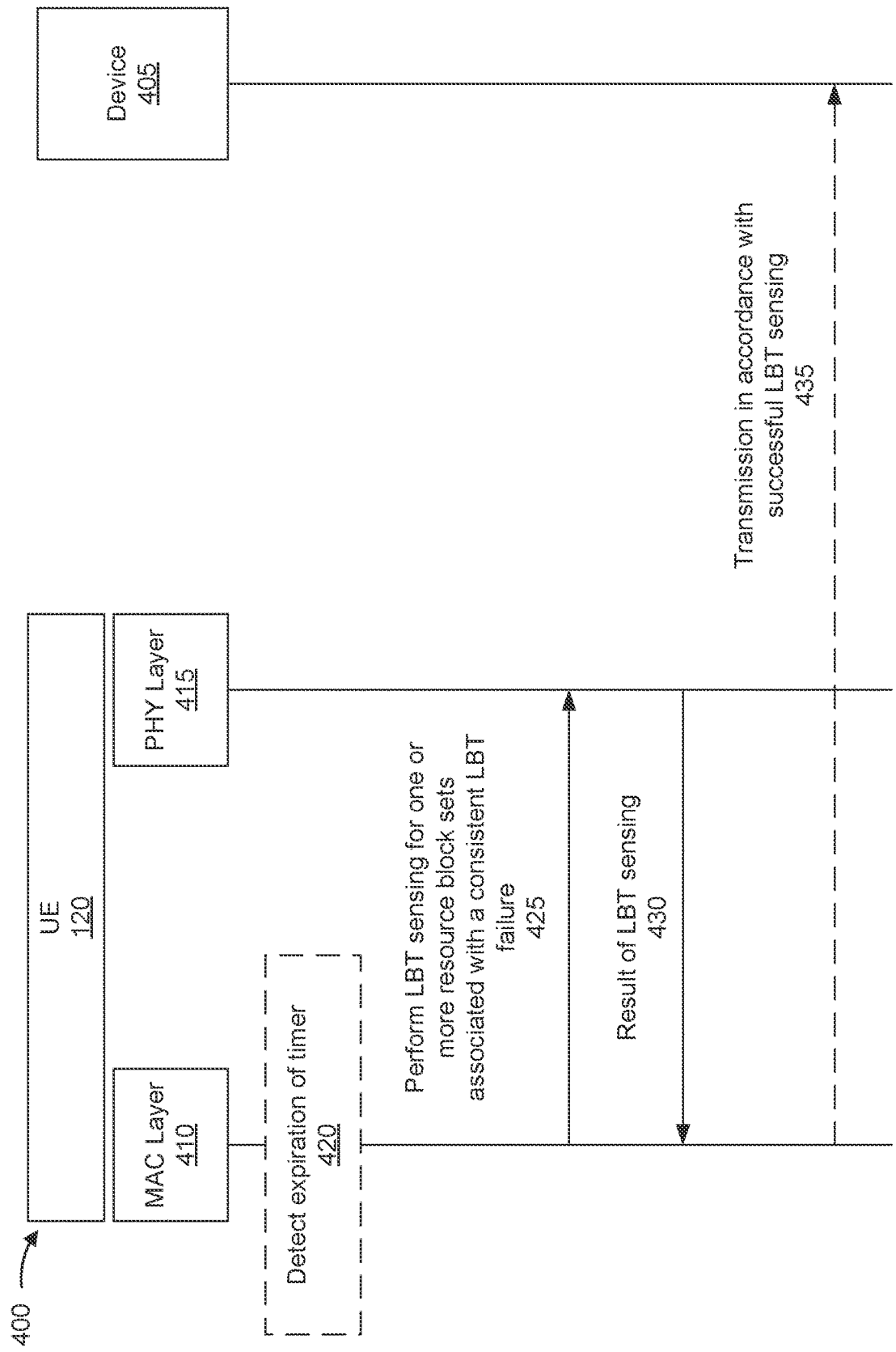
FIG. 4 is a diagram illustrating an example of sidelink listen-before-talk.

FIG. 4 is a diagram illustrating an example 400 of sidelink LBT. The UE 120 may communicate with a device 405. In some aspects, the device 405 may be another UE, and the UE 120 may communicate with the device 405 over a sidelink communication channel (such as the sidelink channel 310). As shown in the figure, a MAC layer 410 and a PHY layer 415 associated with the UE 120 may communicate. Additionally, the MAC layer 410 and the PHY layer 415 may communicate with one or more other protocol layers, such as a radio link control (RLC) layer, a packet data convergence protocol (PDCP) layer, and/or a radio resource control (RRC) layer, among other examples.

In one operation, as shown by reference number 420, the MAC layer 410 may detect an expiration of a timer. The timer may be associated with a consistent LBT failure for one or more resource block sets. In some aspects, the timer may be configured per resource block set. For example, each resource block set of a plurality of resource block sets may be associated with a different timer for detecting consistent LBT failure.

In one operation, as shown by reference number 425, the MAC layer 410 may provide, to the PHY layer 415, an indication to perform LBT sensing for one or more resource block sets associated with a consistent LBT failure. For example, the MAC layer 410 may transmit, and the PHY layer 415 may receive, an indication to perform LBT sensing for one or more resource block sets associated with a consistent LBT failure. The indication to perform LBT sensing may be an indication to perform LBT sensing for sidelink consistent LBT failure without transmitting data. In some aspects, the MAC layer 410 may provide the PHY layer 415 with the indication to perform LBT sensing in accordance with an expiration of the timer. In some other aspects, the MAC layer 410 may provide the PHY layer 415 with the indication to perform LBT sensing without using the timer.

In a first example, the indication to perform LBT sensing may be an indication to perform Type 2 LBT sensing. For example, the MAC layer 410 may transmit, and the PHY 415 layer may receive, an indication to perform Type 2 LBT sensing. In some aspects, the indication to perform Type 2 LBT sensing may be an indication to perform Type 2-A LBT sensing. In some other aspects, the indication to perform Type 2 LBT sensing may be an indication to perform Type 2-B LBT sensing. The MAC layer 410 may transmit the indication to perform Type 2 LBT sensing in accordance with identifying that a quantity of Type 2 LBT sensing operations are sufficient for assessing an availability of the channel. In some aspects, the MAC layer 410 may provide, to the PHY layer 415, an indication of a quantity of one-shot LBT operations to be performed and/or may provide an indication of a gap that is between the quantity of LBT operations. In some aspects, the PHY layer 415 may report a ratio of LBT failures (and/or a ratio of LBT successes). The MAC layer 410 may identify whether the resource block set is available in accordance with whether an LBT success ratio satisfies an LBT success ratio threshold. In some aspects, if the quantity of one-shot LBT operations is one, the PHY layer 415 may report whether the one-shot LBT operation was a success or a failure. In some aspects, the MAC layer 410 may trigger a quantity of LBT sensing operations to be performed, and may compute an average LBT success ratio for the quantity of LBT sensing operations. Additionally or alternatively, the MAC layer 410 may identify whether an average of the reported LBT success ratios satisfies an average LBT success ratio threshold.

In a second example, the indication to perform LBT sensing may be an indication to perform Type 1 LBT sensing. For example, the MAC layer 410 may transmit, and the PHY 415 layer may receive, an indication to perform Type 1 LBT sensing. In some aspects, the indication to perform the Type 1 LBT sensing may be an indication to perform a quantity of LBT sensing operations prior to an expiration of a counter value. In some aspects, the MAC layer 410 may provide, to the PHY layer 415, an indication of the counter value. In some other aspects, the MAC layer 410 may provide, to the PHY layer 415, an indication of a contention window, and the PHY layer 415 may select a counter value in accordance with the contention window.

In a third example, the indication to perform LBT sensing may be an indication to perform Type 1 LBT sensing and Type 2 LBT sensing. For example, the MAC layer 410 may transmit, and the PHY 415 layer may receive, an indication to perform a combination of Type 1 LBT sensing operations and Type 2 LBT sensing operations. The MAC layer 410 may indicate an LBT type to be used, and/or may indicate a parameter corresponding to the LBT type to be used. In some aspects, the MAC layer 410 may trigger a quantity of Type 1 LBT operations to be performed. The MAC layer 410 may identify whether a resource block set is available in accordance with an LBT success ratio, associated with the quantity of LBT sensing operations, satisfying a threshold LBT success ratio.

In some aspects, if a quantity of successful LBT operations for a resource block set satisfies a threshold quantity of successful LBT operations, and/or if a ratio of successful LBT operations for the resource block set satisfies a threshold ratio of successful LBT operations, the MAC layer 410 may provide, to the PHY layer 415, an indication to include the resource block set and/or an indication to switch to a resource pool that includes the resource block set.

In one operation, as shown by reference number 430, the PHY layer 415 may provide, to the MAC layer 410, a result of the LBT sensing. For example, the PHY layer 415 may transmit, and the MAC layer 410 may receive, an indication of whether the LBT sensing for the resource block set was successful or an indication of whether the LBT sensing for the resource block set was a failure.

In one operation, as shown by reference number 435, the UE 120 may transmit, and the device 405 may receive, data in accordance with a successful LBT sensing operation. For example, the MAC layer 410 associated with the UE 120 may transmit, and the device 405 may receive, data using the resource block set in accordance with the LBT sensing operation for the resource block set being successful.

Figure 5:
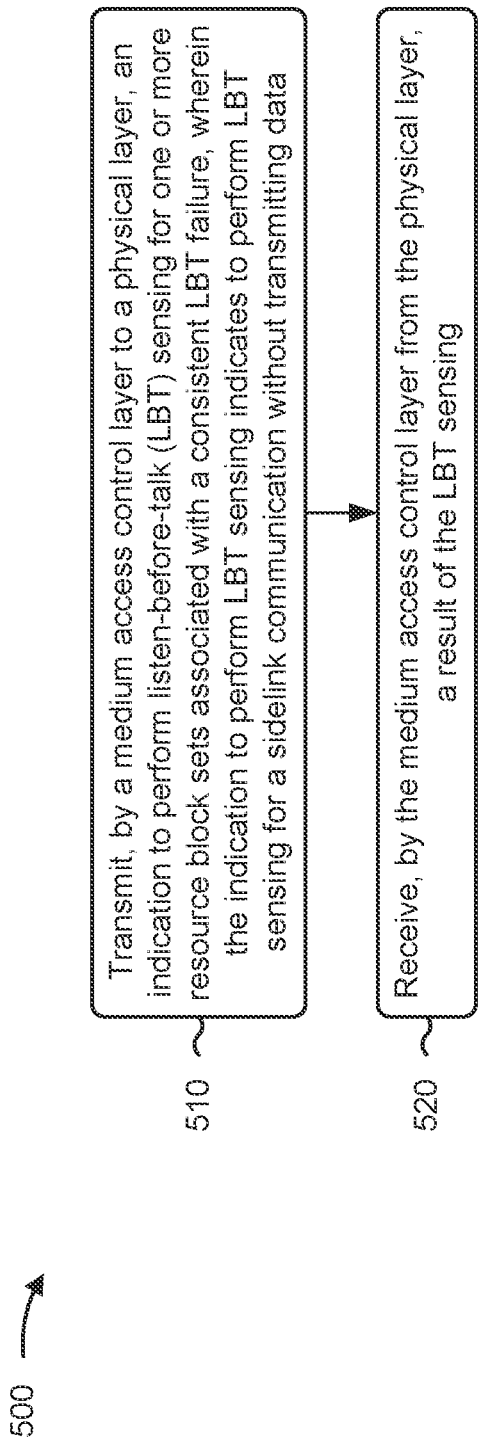
FIG. 5 is a flowchart illustrating an example process performed, for example, at a UE or an apparatus of a UE that supports wireless communications.

FIG. 5 is a flowchart illustrating an example process 500 performed, for example, at a UE or an apparatus of a UE that supports wireless communications. Example process 500 is an example where the apparatus or the UE (for example, UE 120) performs operations associated with sidelink LBT sensing.

As shown in FIG. 5, in some aspects, process 500 may include transmitting an indication to perform LBT sensing for one or more resource block sets associated with a consistent LBT failure, wherein the indication to perform LBT sensing indicates to perform LBT sensing for a sidelink communication without transmitting data (block 510). For example, the UE (such as by using communication manager 140 or transmission component 604, depicted in FIG. 6) may transmit an indication to perform LBT sensing for one or more resource block sets associated with a consistent LBT failure, wherein the indication to perform LBT sensing indicates to perform LBT sensing for a sidelink communication without transmitting data, as described above.

As further shown in FIG. 5, in some aspects, process 500 may include receiving a result of the LBT sensing (block 520). For example, the UE (such as by using communication manager 140 or reception component 602, depicted in FIG. 6) may receive a result of the LBT sensing, as described above.

Process 500 may include additional aspects, such as any single aspect or any combination of aspects described below or in connection with one or more other processes described elsewhere herein.

In a first additional aspect, transmitting the indication to perform LBT sensing comprises transmitting, in accordance with an expiration of a timer, the indication to perform LBT sensing.

In a second additional aspect, alone or in combination with the first aspect, the timer is configured for each resource block set of the one or more resource block sets.

In a third additional aspect, alone or in combination with one or more of the first and second aspects, the indication to perform LBT sensing is an indication to perform Type 2 LBT sensing.

In a fourth additional aspect, alone or in combination with one or more of the first through third aspects, process 500 includes transmitting, by the medium access control layer to the physical layer, an indication of a quantity of Type 2 LBT sensing operations to be performed and an indication of a gap between each Type 2 LBT sensing operation of the quantity of Type 2 LBT sensing operations.

In a fifth additional aspect, alone or in combination with one or more of the first through fourth aspects, process 500 includes receiving, by the medium access control layer from the physical layer, an LBT sensing failure ratio, and identifying, by the medium access control layer, whether a resource block set of the one or more resource block sets is available in accordance with a quantity of successful LBT sensing operations associated with the resource block set satisfying a threshold quantity of successful LBT sensing operations.

In a sixth additional aspect, alone or in combination with one or more of the first through fifth aspects, the LBT sensing failure ratio indicates an LBT success or an LBT failure in accordance with a quantity of Type 2 LBT sensing operations being equal to one.

In a seventh additional aspect, alone or in combination with one or more of the first through sixth aspects, process 500 includes transmitting, by the medium access control layer to the physical layer, an indication of a quantity of Type 2 LBT sensing operations to be performed, and calculating, by the medium access control layer, an average Type 2 LBT sensing success ratio.

In an eighth additional aspect, alone or in combination with one or more of the first through seventh aspects, process 500 includes identifying, by the medium access control layer, whether the average Type 2 LBT sensing success ratio satisfies an average Type 2 LBT sensing success ratio threshold.

In a ninth additional aspect, alone or in combination with one or more of the first through eighth aspects, the indication to perform LBT sensing is an indication to perform Type 1 LBT sensing.

In a tenth additional aspect, alone or in combination with one or more of the first through ninth aspects, process 500 includes transmitting, by the medium access control layer to the physical layer, a counter value.

In an eleventh additional aspect, alone or in combination with one or more of the first through tenth aspects, process 500 includes transmitting, by the medium access control layer to the physical layer, an indication of a contention window, and selecting, by the physical layer in accordance with the indication of the contention window, a random counter value.

In a twelfth additional aspect, alone or in combination with one or more of the first through eleventh aspects, the indication to perform LBT sensing is an indication to perform a combination of Type 1 LBT sensing and Type 2 LBT sensing.

In a thirteenth additional aspect, alone or in combination with one or more of the first through twelfth aspects, process 500 includes transmitting, by the medium access control layer to the physical layer, an indication to perform Type 1 LBT sensing and an indication of a parameter for the Type 1 LBT sensing, or transmitting, by the medium access control layer to the physical layer, an indication to perform Type 2 LBT sensing and an indication of a parameter for the Type 2 LBT sensing.

In a fourteenth additional aspect, alone or in combination with one or more of the first through thirteenth aspects, process 500 includes triggering, by the medium access control layer, a quantity of Type 1 LBT sensing operations, and identifying, by the medium access control layer, whether a quantity of successful Type 1 LBT operations satisfies a threshold quantity of successful Type 1 LBT operations.

In a fifteenth additional aspect, alone or in combination with one or more of the first through fourteenth aspects, process 500 includes identifying, by the medium access control layer and for the one or more resource block sets, that a quantity of successful LBT sensing operations is greater than a threshold quantity of successful LBT sensing operations or that a ratio of successful LBT sensing operations is greater than a threshold ratio of successful LBT sensing operations, and transmitting, by the medium access control layer to the physical layer, in accordance with the quantity of successful LBT sensing operations being greater than the threshold quantity of successful LBT sensing operations or in accordance with the ratio of successful LBT sensing operations being greater than the threshold ratio of successful LBT sensing operations, an indication to use the one or more resource block sets or an indication to switch to a resource block pool that includes the one or more resource block sets.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
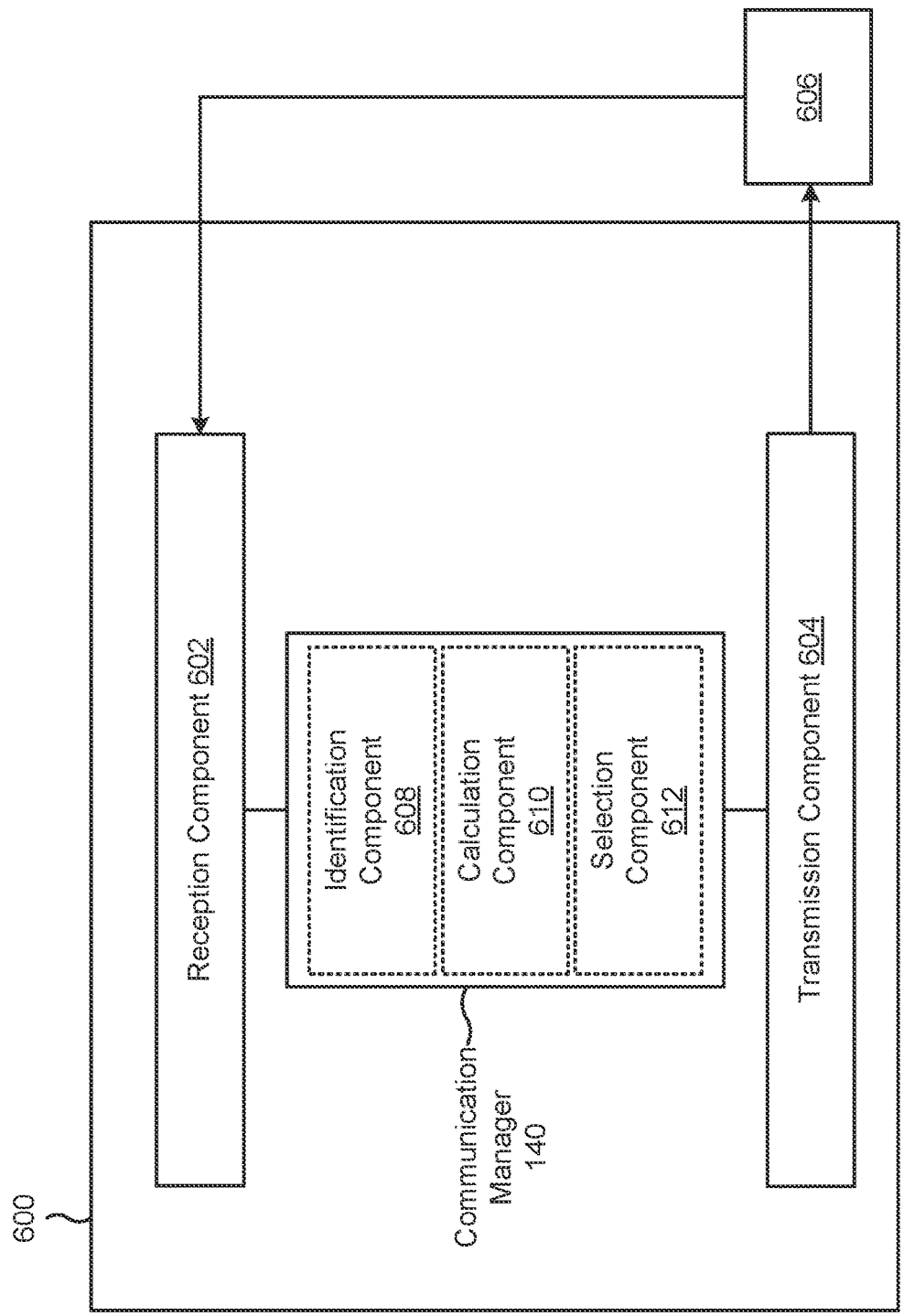
FIG. 6 is a diagram of an example apparatus for wireless communication that supports wireless communications.

FIG. 6 is a diagram of an example apparatus 600 for wireless communication that supports wireless communications. The apparatus 600 may be a UE, or a UE may include the apparatus 600. In some aspects, the apparatus 600 includes a reception component 602, a transmission component 604, and a communication manager 140, which may be in communication with one another (for example, via one or more buses). As shown, the apparatus 600 may communicate with another apparatus 606 (such as a UE, a network node, or another wireless communication device) using the reception component 602 and the transmission component 604.

In some aspects, the apparatus 600 may be configured to and/or operable to perform one or more operations described herein in connection with FIG. 4. Additionally or alternatively, the apparatus 600 may be configured to and/or operable to perform one or more processes described herein, such as process 500 of FIG. 5. In some aspects, the apparatus 600 may include one or more components of the UE described above in connection with FIG. 2.

The reception component 602 may receive communications, such as reference signals, control information, and/or data communications, from the apparatus 606. The reception component 602 may provide received communications to one or more other components of the apparatus 600, such as the communication manager 140. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, one or more modems, one or more demodulators, one or more MIMO detectors, one or more receive processors, one or more controllers/processors, and/or one or more memories of the UE described above in connection with FIG. 2.

The transmission component 604 may transmit communications, such as reference signals, control information, and/or data communications, to the apparatus 606. In some aspects, the communication manager 140 may generate communications and may transmit the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 604 may be co-located with the reception component 602 in one or more transceivers.

The communication manager 140 may transmit or may cause the transmission component 604 to transmit an indication to perform LBT sensing for one or more resource block sets associated with a consistent LBT failure, wherein the indication to perform LBT sensing indicates to perform LBT sensing for a sidelink communication without transmitting data. The communication manager 140 may receive or may cause the reception component 602 to receive a result of the LBT sensing. In some aspects, the communication manager 140 may perform one or more operations described elsewhere herein as being performed by one or more components of the communication manager 140.

The communication manager 140 may include one or more controllers/processors and/or one or more memories of the UE described above in connection with FIG. 2. In some aspects, the communication manager 140 includes a set of components, such as an identification component 608, a calculation component 610, and/or a selection component 612. Alternatively, the set of components may be separate and distinct from the communication manager 140. In some aspects, one or more components of the set of components may include or may be implemented within one or more controllers/processors and/or one or more memories of the UE described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The transmission component 604 may transmit an indication to perform LBT sensing for one or more resource block sets associated with a consistent LBT failure, wherein the indication to perform LBT sensing indicates to perform LBT sensing for a sidelink communication without transmitting data. The reception component 602 may receive a result of the LBT sensing.

The transmission component 604 may transmit an indication of a quantity of Type 2 LBT sensing operations to be performed and an indication of a gap between each Type 2 LBT sensing operation of the quantity of Type 2 LBT sensing operations. The reception component 602 may receive an LBT sensing failure ratio. The identification component 608 may identify whether a resource block set of the one or more resource block sets is available in accordance with a quantity of successful LBT sensing operations associated with the resource block set satisfying a threshold quantity of successful LBT sensing operations. The transmission component 604 may transmit an indication of a quantity of Type 2 LBT sensing operations to be performed. The calculation component 610 may calculate an average Type 2 LBT sensing success ratio. The identification component 608 may identify whether the average Type 2 LBT sensing success ratio satisfies an average Type 2 LBT sensing success ratio threshold.

The transmission component 604 may transmit a counter value. The transmission component 604 may transmit an indication of a contention window. The selection component 612 may select a random counter value. The transmission component 604 may transmit an indication to perform Type 1 LBT sensing and an indication of a parameter for the Type 1 LBT sensing. The transmission component 604 may transmit an indication to perform Type 2 LBT sensing and an indication of a parameter for the Type 2 LBT sensing. The identification component 608 may identify whether a quantity of successful Type 1 LBT operations satisfies a threshold quantity of successful Type 1 LBT operations. The identification component 608 may identify, for the one or more resource block sets, that a quantity of successful LBT sensing operations is greater than a threshold quantity of successful LBT sensing operations or that a ratio of successful LBT sensing operations is greater than a threshold ratio of successful LBT sensing operations. The transmission component 604 may transmit, in accordance with the quantity of successful LBT sensing operations being greater than the threshold quantity of successful LBT sensing operations or in accordance with the ratio of successful LBT sensing operations being greater than the threshold ratio of successful LBT sensing operations, an indication to use the one or more resource block sets or an indication to switch to a resource block pool that includes the one or more resource block sets.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

The following provides an overview of some Aspects of the present disclosure:

Aspect 1: A method for wireless communication performed at a user equipment (UE), comprising: transmitting, by a medium access control layer to a physical layer, an indication to perform listen-before-talk (LBT) sensing for one or more resource block sets associated with a consistent LBT failure, wherein the indication to perform LBT sensing indicates to perform LBT sensing for a sidelink communication without transmitting data; and receiving, by the medium access control layer from the physical layer, a result of the LBT sensing.

Aspect 2: The method of Aspect 1, wherein transmitting the indication to perform LBT sensing comprises transmitting, in accordance with an expiration of a timer, the indication to perform LBT sensing.

Aspect 3: The method of Aspect 2, wherein the timer is configured for each resource block set of the one or more resource block sets.

Aspect 4: The method of any of Aspects 1-3, wherein the indication to perform LBT sensing is an indication to perform Type 2 LBT sensing.

Aspect 5: The method of Aspect 4, further comprising transmitting, by the medium access control layer to the physical layer, an indication of a quantity of Type 2 LBT sensing operations to be performed and an indication of a gap between each Type 2 LBT sensing operation of the quantity of Type 2 LBT sensing operations.

Aspect 6: The method of Aspect 4, further comprising: receiving, by the medium access control layer from the physical layer, an LBT sensing failure ratio; and identifying, by the medium access control layer, whether a resource block set of the one or more resource block sets is available in accordance with a quantity of successful LBT sensing operations associated with the resource block set satisfying a threshold quantity of successful LBT sensing operations.

Aspect 7: The method of Aspect 6, wherein the LBT sensing failure ratio indicates an LBT success or an LBT failure in accordance with a quantity of Type 2 LBT sensing operations being equal to one.

Aspect 8: The method of Aspect 6, further comprising: transmitting, by the medium access control layer to the physical layer, an indication of a quantity of Type 2 LBT sensing operations to be performed; and calculating, by the medium access control layer, an average Type 2 LBT sensing success ratio.

Aspect 9: The method of Aspect 8, further comprising identifying, by the medium access control layer, whether the average Type 2 LBT sensing success ratio satisfies an average Type 2 LBT sensing success ratio threshold.

Aspect 10: The method of any of Aspects 1-9, wherein the indication to perform LBT sensing is an indication to perform Type 1 LBT sensing.

Aspect 11: The method of Aspect 10, further comprising transmitting, by the medium access control layer to the physical layer, a counter value.

Aspect 12: The method of Aspect 10, further comprising: transmitting, by the medium access control layer to the physical layer, an indication of a contention window; and selecting, by the physical layer in accordance with the indication of the contention window, a random counter value.

Aspect 13: The method of any of Aspects 1-12, wherein the indication to perform LBT sensing is an indication to perform a combination of Type 1 LBT sensing and Type 2 LBT sensing.

Aspect 14: The method of Aspect 13, further comprising: transmitting, by the medium access control layer to the physical layer, an indication to perform Type 1 LBT sensing and an indication of a parameter for the Type 1 LBT sensing; or transmitting, by the medium access control layer to the physical layer, an indication to perform Type 2 LBT sensing and an indication of a parameter for the Type 2 LBT sensing.

Aspect 15: The method of Aspect 13, further comprising: triggering, by the medium access control layer, a quantity of Type 1 LBT sensing operations; and identifying, by the medium access control layer, whether a quantity of successful Type 1 LBT operations satisfies a threshold quantity of successful Type 1 LBT operations.

Aspect 16: The method of any of Aspects 1-15, further comprising: identifying, by the medium access control layer and for the one or more resource block sets, that a quantity of successful LBT sensing operations is greater than a threshold quantity of successful LBT sensing operations or that a ratio of successful LBT sensing operations is greater than a threshold ratio of successful LBT sensing operations; and transmitting, by the medium access control layer to the physical layer, in accordance with the quantity of successful LBT sensing operations being greater than the threshold quantity of successful LBT sensing operations or in accordance with the ratio of successful LBT sensing operations being greater than the threshold ratio of successful LBT sensing operations, an indication to use the one or more resource block sets or an indication to switch to a resource block pool that includes the one or more resource block sets.

Aspect 17: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-16.

Aspect 18: An apparatus for wireless communication at a device, the apparatus comprising one or more memories and one or more processors coupled to the one or more memories, the one or more processors configured to cause the device to perform the method of one or more of Aspects 1-16.

Aspect 19: An apparatus for wireless communication, the apparatus comprising at least one means for performing the method of one or more of Aspects 1-16.

Aspect 20: A non-transitory computer-readable medium storing code for wireless communication, the code comprising instructions executable by one or more processors to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

Aspect 22: A device for wireless communication, the device comprising a processing system that includes one or more processors and one or more memories coupled with the one or more processors, the processing system configured to cause the device to perform the method of one or more of Aspects 1-16.

Aspect 23: An apparatus for wireless communication at a device, the apparatus comprising one or more memories and one or more processors coupled to the one or more memories, the one or more processors individually or collectively configured to cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions. The term "identify" or "identifying" also encompasses a wide variety of actions and, therefore, "identifying" can include calculating, computing, processing, deriving, investigating, looking up (such as via looking up in a table, a database or another data structure), inferring, ascertaining, measuring, and the like. Also, "identifying" can include receiving (such as receiving information or receiving an indication), accessing (such as accessing data stored in memory), transmitting (such as transmitting information) and the like. Also, "identifying" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:
    one or more memories storing processor-executable code; and
    one or more processors coupled with the one or more memories, at least one processor of the one or more processors configured to cause the UE to:
        transmit an indication to perform listen-before-talk (LBT) sensing for one or more resource block sets associated with a consistent LBT failure, wherein the indication to perform LBT sensing indicates to perform LBT sensing for a sidelink communication without transmitting data; and
        receive a result of the LBT sensing.

2. The apparatus of claim 1, wherein at least one processor of the one or more processors, to cause the UE to transmit the indication to perform LBT sensing, is configured to cause the UE to transmit, in accordance with an expiration of a timer, the indication to perform LBT sensing.

3. The apparatus of claim 2, wherein the timer is configured for each resource block set of the one or more resource block sets.

4. The apparatus of claim 1, wherein the indication to perform LBT sensing is an indication to perform Type 2 LBT sensing.

5. The apparatus of claim 4, wherein at least one processor of the one or more processors is further configured to cause the UE to:
    receive an LBT sensing failure ratio; and
    identify whether a resource block set of the one or more resource block sets is available in accordance with a quantity of successful LBT sensing operations associated with the resource block set satisfying a threshold quantity of successful LBT sensing operations.

6. The apparatus of claim 5, wherein the LBT sensing failure ratio indicates an LBT success or an LBT failure in accordance with a quantity of Type 2 LBT sensing operations being equal to one.

7. The apparatus of claim 5, wherein at least one processor of the one or more processors is further configured to cause the UE to:
    transmit an indication of a quantity of Type 2 LBT sensing operations to be performed; and
    calculate an average Type 2 LBT sensing success ratio.

8. The apparatus of claim 7, wherein at least one processor of the one or more processors is further configured to cause the UE to identify whether the average Type 2 LBT sensing success ratio satisfies an average Type 2 LBT sensing success ratio threshold.

9. The apparatus of claim 1, wherein the indication to perform LBT sensing is an indication to perform Type 1 LBT sensing.

10. The apparatus of claim 9, wherein at least one processor of the one or more processors is further configured to cause the UE to transmit a counter value.

11. The apparatus of claim 9, wherein at least one processor of the one or more processors is further configured to cause the UE to:
   transmit an indication of a contention window; and
   select a random counter value.

12. The apparatus of claim 1, wherein the indication to perform LBT sensing is an indication to perform a combination of Type 1 LBT sensing and Type 2 LBT sensing.

13. The apparatus of claim 12, wherein at least one processor of the one or more processors is further configured to cause the UE to:
   transmit an indication to perform Type 1 LBT sensing and an indication of a parameter for the Type 1 LBT sensing; or
   transmit an indication to perform Type 2 LBT sensing and an indication of a parameter for the Type 2 LBT sensing.

14. The apparatus of claim 12, wherein at least one processor of the one or more processors is further configured to cause the UE to:
   trigger a quantity of Type 1 LBT sensing operations; and
   identify whether a quantity of successful Type 1 LBT operations satisfies a threshold quantity of successful Type 1 LBT operations.

15. The apparatus of claim 1, wherein at least one processor of the one or more processors is further configured to cause the UE to:
   identify, for the one or more resource block sets, that a quantity of successful LBT sensing operations is greater than a threshold quantity of successful LBT sensing operations or that a ratio of successful LBT sensing operations is greater than a threshold ratio of successful LBT sensing operations; and
   transmit, in accordance with the quantity of successful LBT sensing operations being greater than the threshold quantity of successful LBT sensing operations or in accordance with the ratio of successful LBT sensing operations being greater than the threshold ratio of successful LBT sensing operations, an indication to use the one or more resource block sets or an indication to switch to a resource block pool that includes the one or more resource block sets.

16. A method for wireless communication performed at a user equipment (UE), comprising:
   transmitting, by a medium access control layer to a physical layer, an indication to perform listen-before-talk (LBT) sensing for one or more resource block sets associated with a consistent LBT failure, wherein the indication to perform LBT sensing indicates to perform LBT sensing for a sidelink communication without transmitting data; and
   receiving, by the medium access control layer from the physical layer, a result of the LBT sensing.

17. The method of claim 16, wherein transmitting the indication to perform LBT sensing comprises transmitting, in accordance with an expiration of a timer, the indication to perform LBT sensing.

18. The method of claim 17, wherein the timer is configured for each resource block set of the one or more resource block sets.

19. The method of claim 16, wherein the indication to perform LBT sensing is an indication to perform Type 2 LBT sensing.

20. The method of claim 19, further comprising transmitting, by the medium access control layer to the physical layer, an indication of a quantity of Type 2 LBT sensing operations to be performed and an indication of a gap between each Type 2 LBT sensing operation of the quantity of Type 2 LBT sensing operations.

21. The method of claim 19, further comprising:
   receiving, by the medium access control layer from the physical layer, an LBT sensing failure ratio; and
   identifying, by the medium access control layer, whether a resource block set of the one or more resource block sets is available in accordance with a quantity of successful LBT sensing operations associated with the resource block set satisfying a threshold quantity of successful LBT sensing operations.

22. The method of claim 21, further comprising:
   transmitting, by the medium access control layer to the physical layer, an indication of a quantity of Type 2 LBT sensing operations to be performed; and
   calculating, by the medium access control layer, an average Type 2 LBT sensing success ratio.

23. The method of claim 22, further comprising identifying, by the medium access control layer, whether the average Type 2 LBT sensing success ratio satisfies an average Type 2 LBT sensing success ratio threshold.

24. The method of claim 16, wherein the indication to perform LBT sensing is an indication to perform Type 1 LBT sensing.

25. The method of claim 24, further comprising transmitting, by the medium access control layer to the physical layer, a counter value.

26. The method of claim 24, further comprising:
   transmitting, by the medium access control layer to the physical layer, an indication of a contention window; and
   selecting, by the physical layer in accordance with the indication of the contention window, a random counter value.

27. The method of claim 16, wherein the indication to perform LBT sensing is an indication to perform a combination of Type 1 LBT sensing and Type 2 LBT sensing.

28. The method of claim 27, further comprising:
   triggering, by the medium access control layer, a quantity of Type 1 LBT sensing operations; and
   identifying, by the medium access control layer, whether a quantity of successful Type 1 LBT operations satisfies a threshold quantity of successful Type 1 LBT operations.

29. A non-transitory computer-readable medium storing a set of instructions for wireless communication, the set of instructions comprising:
   one or more instructions that, when executed by one or more processors of a user equipment (UE), cause the UE to:
      transmit an indication to perform listen-before-talk (LBT) sensing for one or more resource block sets associated with a consistent LBT failure, wherein the indication to perform LBT sensing indicates to perform LBT sensing for a sidelink communication without transmitting data; and
      receive a result of the LBT sensing.

30. An apparatus for wireless communication, comprising:
   means for transmitting an indication to perform listen-before-talk (LBT) sensing for one or more resource block sets associated with a consistent LBT failure, wherein the indication to perform LBT sensing indicates to perform LBT sensing for a sidelink communication without transmitting data; and means for receiving a result of the LBT sensing.

\* \* \* \* \*